US012659857B2

(12) United States Patent
Hart et al.

(10) Patent No.: US 12,659,857 B2
(45) Date of Patent: Jun. 16, 2026

(54) PREAMBLE EXTENSION FIELDS IN WAKEUP PPDUS

(71) Applicant: Cisco Technology, Inc., San Jose, CA (US)

(72) Inventors: Brian D. Hart, Sunnyvale, CA (US); Pooya Monajemi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 481 days.

(21) Appl. No.: 18/194,500

(22) Filed: Mar. 31, 2023

(65) Prior Publication Data

US 2024/0334324 A1     Oct. 3, 2024

(51) Int. Cl.
H04W 52/02          (2009.01)

(52) U.S. Cl.
CPC ... H04W 52/0216 (2013.01); H04W 52/0238 (2013.01)

(58) Field of Classification Search
CPC ......... H04W 52/0216; H04W 52/0238; H04W 52/0235; H04W 52/028; H04W 84/12; Y02D 30/70
See application file for complete search history.

(56) References Cited

U.S. PATENT DOCUMENTS

| | | | | |
|---|---|---|---|---|
| 12,323,918 | B2 * | 6/2025 | Lin ...................... | H04B 7/0617 |
| 2018/0020410 | A1 | 1/2018 | Park | |
| 2018/0077641 | A1 | 3/2018 | Yang | |
| 2019/0028968 | A1 | 1/2019 | Ma et al. | |
| 2020/0137770 | A1 * | 4/2020 | Chitrakar .......... | H04W 72/0446 |

| | | | | |
|---|---|---|---|---|
| 2020/0287759 | A1 * | 9/2020 | Van Nee ............. | H04L 27/2613 |
| 2022/0346013 | A1 | 10/2022 | Kristem et al. | |
| 2024/0015059 | A1 * | 1/2024 | Balakrishnan ...... | H04L 27/2085 |
| 2024/0196476 | A1 * | 6/2024 | Qu ........................ | H04W 76/28 |

FOREIGN PATENT DOCUMENTS

| | | |
|---|---|---|
| WO | 2018016756 A1 | 1/2018 |
| WO | 2022170249 A1 | 8/2022 |

OTHER PUBLICATIONS

X. Chen et al., "Low Power Listening Mode," IEEE, Dated: Aug. 31, 2022, pp. 1-13.

Hart B. (Cisco Systems), et al., "Low Power and Long Range Preamble", IEEE Draft, 11-23-1100-00-0UHR-Low-Power-And-Long-Rang E-Preamble, IEEE-SA Mentor, Piscataway, NJ, USA, vol. 802.11 UHR, Jul. 10, 2023, pp. 1-6, XP068204092, Retrieved from https://mentor.ieee.org/802.11/dcn/23/11-23-1100-00-0uhr-low-power-and-long-range-preamble.pptx on Jul. 10, 2023, The whole document.

International Search Report and Written Opinion for International Application No. PCT/US2024/018730, mailed Jul. 4, 2024, 17 Pages.

* cited by examiner

*Primary Examiner* — Robert C Scheibel

(74) *Attorney, Agent, or Firm* — Patterson + Sheridan, LLP

(57) ABSTRACT

Embodiments herein describe waking up client devices using a physical layer protocol data unit (PPDU) with a preamble extension field with a length that permits the client device to wake up a higher power (or higher capability) radio. In one embodiment, a first portion of a preamble of the PPDU is received at the client device using a lower power (or lower capability) receiver. This triggers the client device to wake up its higher power receiver, which occurs while the client device receives the preamble extension field. At the end of the preamble extension field, the client device then receives the remaining portion of the PPDU using its higher power receiver.

20 Claims, 7 Drawing Sheets

400 WAKEUP PPDU

| 410 | 415 | 420 | 425 |
|---|---|---|---|
| FIRST PORTION | PREAMBLE EXTENSION FIELD | SECOND PORTION | PAYLOAD |

405
PREAMBLE

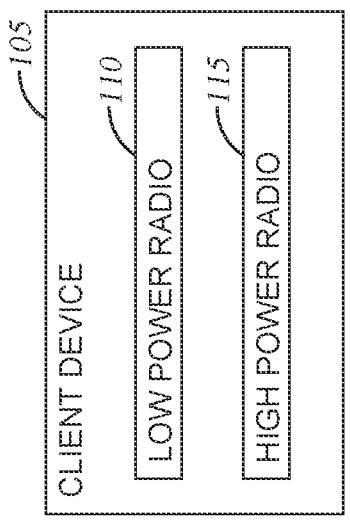
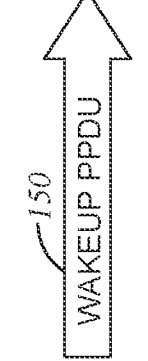
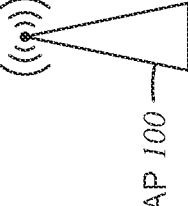
*Fig. 1*

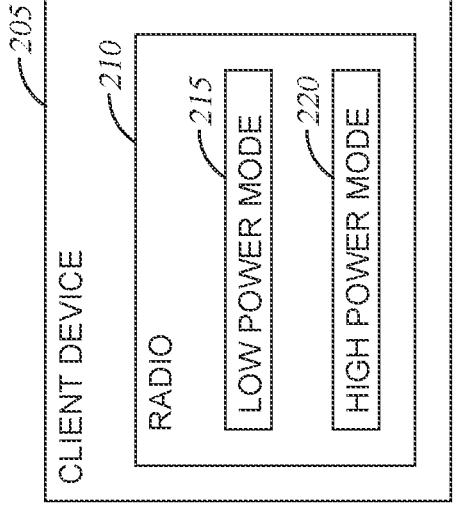
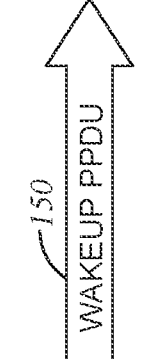
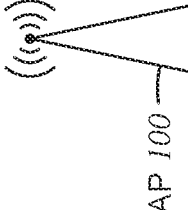
*Fig. 2*

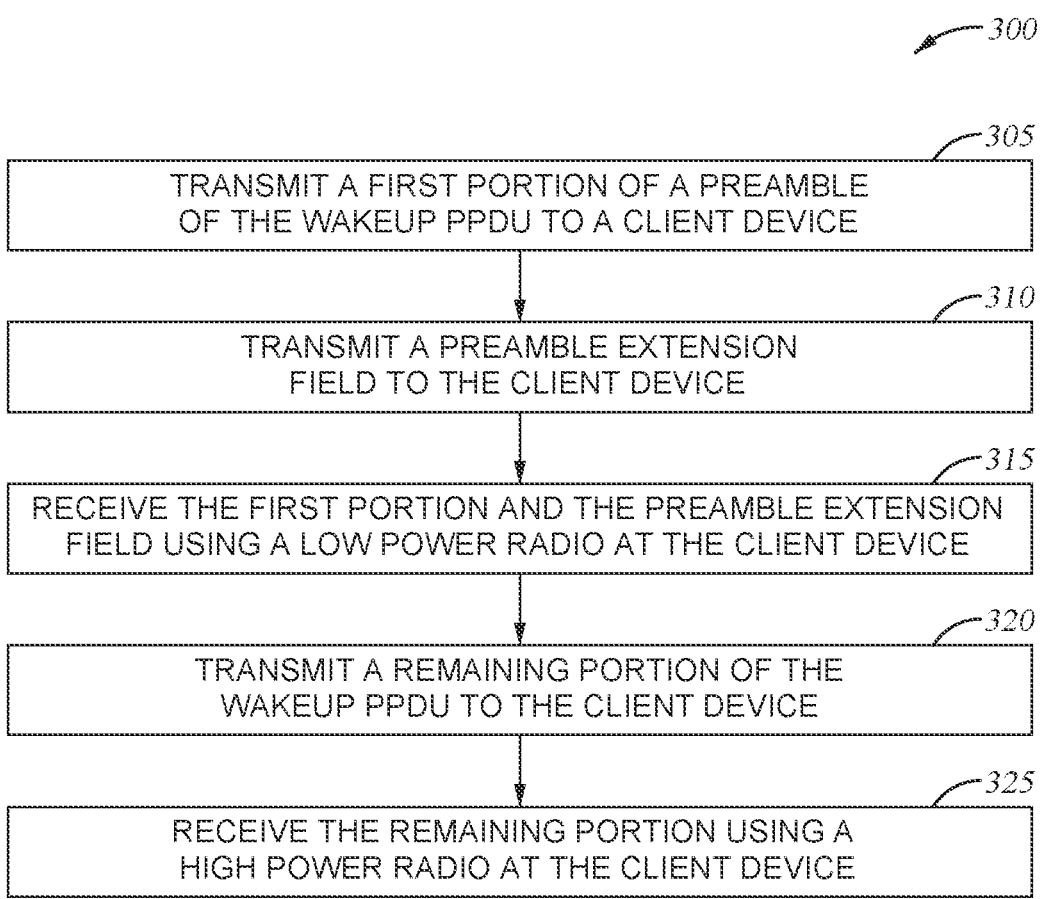

*300*

*305*
TRANSMIT A FIRST PORTION OF A PREAMBLE
OF THE WAKEUP PPDU TO A CLIENT DEVICE

*310*
TRANSMIT A PREAMBLE EXTENSION
FIELD TO THE CLIENT DEVICE

*315*
RECEIVE THE FIRST PORTION AND THE PREAMBLE EXTENSION
FIELD USING A LOW POWER RADIO AT THE CLIENT DEVICE

*320*
TRANSMIT A REMAINING PORTION OF THE
WAKEUP PPDU TO THE CLIENT DEVICE

*325*
RECEIVE THE REMAINING PORTION USING A
HIGH POWER RADIO AT THE CLIENT DEVICE

*Fig. 3*

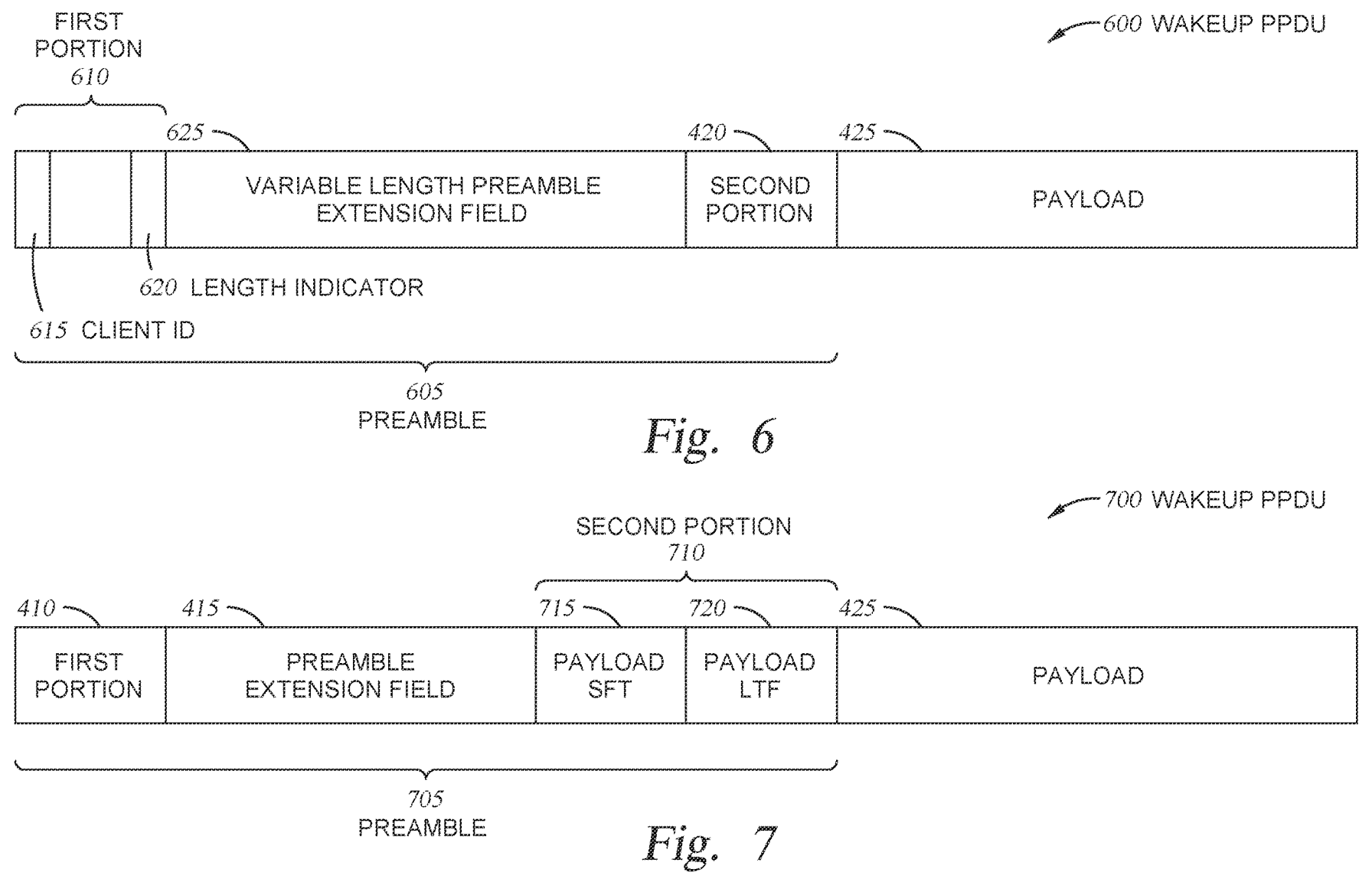

600 WAKEUP PPDU

FIRST PORTION 610

625 VARIABLE LENGTH PREAMBLE EXTENSION FIELD

620 LENGTH INDICATOR

615 CLIENT ID

605 PREAMBLE

420 SECOND PORTION

425 PAYLOAD

Fig. 6

700 WAKEUP PPDU

410 FIRST PORTION

415 PREAMBLE EXTENSION FIELD

705 PREAMBLE

SECOND PORTION 710

715 PAYLOAD SFT

720 PAYLOAD LTF

425 PAYLOAD

Fig. 7

PREAMBLE EXTENSION FIELDS IN WAKEUP PPDUS

TECHNICAL FIELD

Embodiments presented in this disclosure generally relate to waking up a client device using a physical layer protocol data unit (PPDU) with a preamble extension field with sufficient length to enable the client device to power up a high power receiver.

BACKGROUND

As part of the enhanced multilink single radio (eMLSR) innovation in Wi-Fi7, client vendors have built low power receivers with limited capability, such as limited spatial streams (SS), limited modulation, and (optionally for parts of the receiver) limited bandwidth (BW). These client devices also have more capable receivers (e.g., higher power receivers or radios) with increased SS, higher modulation rates, and (optionally for parts of the receiver) greater BW. The low-capability radio awaits a short frame such as multi-user request to send (MU-RTS) frame, then sends a response frame (e.g., clear to send (CTS) frame) and in parallel or substantially in parallel triggers the client to activate (or wakeup) its high capability radio to receive a subsequent high data rate PPDU.

However, sending one or more C-frames or PPDUs to wake up a client device can be inefficient, due to sending duplicative data and requiring additional overhead.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 1 illustrates a wireless communication system for waking up a client device, according to one embodiment.

FIG. 2 illustrates a wireless communication system for waking up a client device, according to one embodiment.

FIG. 3 is a flowchart for waking up a client device, according to one embodiment.

FIG. 6 is a block diagram of a wakeup PPDU with a variable length preamble extension field, according to one embodiment.

FIG. 7 is a block diagram of a wakeup PPDU with a preamble extension field, according to one embodiment.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 4:
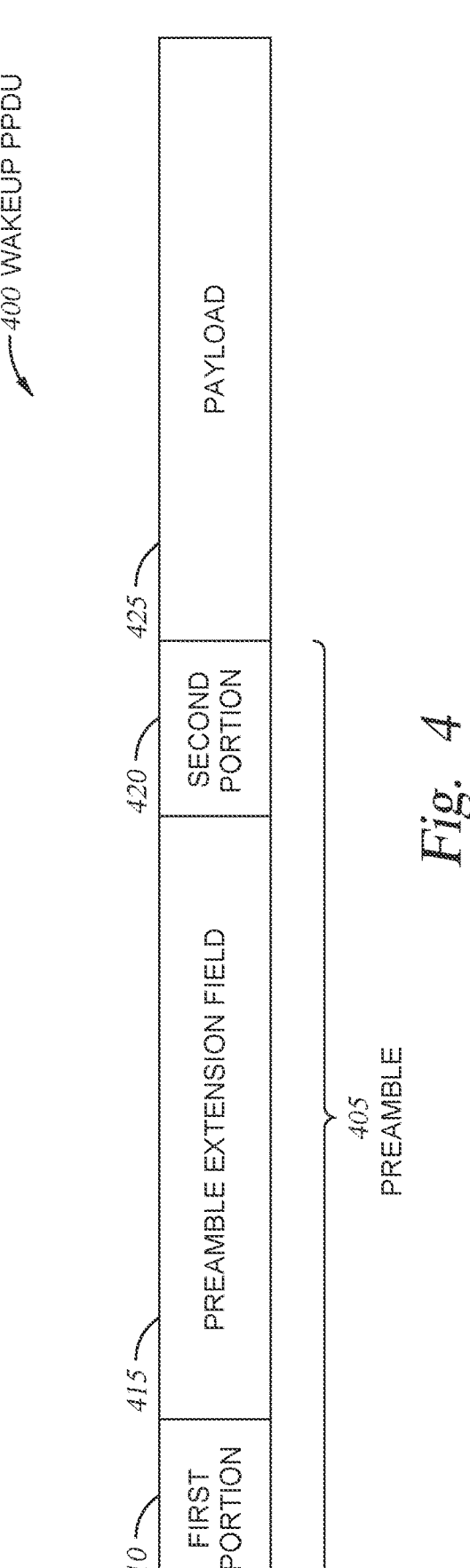
FIG. 4 is a block diagram of a wakeup PPDU with a preamble extension field, according to one embodiment.

One embodiment presented in this disclosure is an AP that includes a processor and memory comprising an application that, when executed by the processor performs an operation. The operation includes transmitting a first portion of a preamble of the wakeup physical layer protocol data unit (PPDU) to a client device, transmitting a preamble extension field to the client device after transmitting the first portion of the wakeup PPDU where the first portion and the preamble extension field are received at a receiver operating at lower power in the client device and where the preamble extension field provides sufficient time for the client device to wake up a receiver operating at higher power, and transmitting a remaining portion of the wakeup PPDU to the client device which is received using the receiver operating at higher power.

One embodiment presented in this disclosure is a method that includes transmitting a first portion of a preamble of the wakeup physical layer protocol data unit (PPDU) to a client device, transmitting a preamble extension field to the client device after transmitting the first portion of the wakeup PPDU where the first portion and the preamble extension field are received at a receiver operating at lower power in the client device and where the preamble extension field provides sufficient time for the client device to wake up a receiver operating at higher power, and transmitting a remaining portion of the wakeup PPDU to the client device which is received using the receiver operating at higher power.

Another embodiment presented in this disclosure is a first station (STA) that includes a processor and memory comprising an application that, when executed by the processor performs an operation. The operation includes receiving a first portion of a preamble of the wakeup physical layer protocol data unit (PPDU) from a second wireless STA where the first portion comprising information to wake up the first wireless STA, receiving a preamble extension field from the second wireless STA after receiving the first portion of the preamble where the first portion and the preamble extension field are received before the first wireless STA has woken up and where the preamble extension field provides sufficient time for the first wireless STA to wake up a receiver operating at higher power, and receiving a remaining portion of the wakeup PPDU at the first wireless STA which is received using the receiver operating at higher power.

EXAMPLE EMBODIMENTS

Embodiments herein describe waking up client devices using a PPDU with a preamble extension field with a length that permits the client device to wake up a higher power (or higher capability) receiver. In one embodiment, a first portion of a preamble of the PPDU is received at the client device using a lower power (or lower capability) receiver. This triggers the client device to wake up its higher power radio (or higher capability), which occurs while the client device receives the preamble extension field of the PPDU. At the end of the preamble extension field, the client device then receives the remaining portion of the wakeup PPDU using its higher power receiver. This remaining portion can include the remaining fields in the preamble (e.g., payload training fields) and the data payload (e.g., the data field). In this manner, one PPDU can be used to wake up a client device which avoids the overhead and inefficiency of previous wake up solutions that rely on multiple frames or multiple PPDUs (e.g., a MU-RTS and a CTS, or some other frame such as a MU-CTS2self frame).

In some embodiments, an access point (AP) transmits "filler" data in the preamble extension field which can be ignored by the client device. But in other embodiments the preamble extension field can be used to improve the wireless communication between the AP and the client device. For example, the preamble extension field can be used to transmit at least one duplicate or copy of the first portion of the preamble (or a sub-portion of the first portion of the preamble) that was transmitted to the client device when in the low power state. By averaging the duplicates or copies, the client device can mitigate the effect of noise and interference on the PPDU, and thus, improve the signal range.

FIG. 1 illustrates a wireless communication system for waking up a client device, according to one embodiment. FIG. 1 includes an AP 100 and a client device 105. The client device 105 can be an internet-of-things (IoT) device, mobile phone, tablet, laptop, etc. Although not shown, the AP 100 and the client device 105 can include one or more processors and memory that can store software applications for performing the functions described herein.

The client device 105 includes a low power radio 110 which is used when the device 105 is in a low power mode and a high power radio 115 that is used in a high power mode (or normal mode). The radios 110 and 115 can include respective low and high power receivers. In one embodiment, the client device 105 is in the high power mode when communicating with the AP 100. That is, if the client device 105 is currently in the low power mode, the client device 105 first switches to the high power mode before communicating with the AP 100, or shortly before transmitting the second portion and payload.

The AP 100 can transmit a wakeup PPDU 150 to the client device 105 to switch it from the low power mode to the high power mode. In the low power mode, the high power radio 115 may be turned off to or converted to a low power sleep mode, e.g., to conserve power. Thus, at least a first portion of the wakeup PPDU 150 is received by the low power radio 110. When decoded, this first portion instructs the client device 105 to power on (or activate) the high power radio 115. In another embodiment, this first portion indicates that the client device 105 requires a more capable receiver than the low power receiver and the indication acts as a trigger to cause the client to power on (or activate) the high power radio 115. As discussed in more detail below, the PPDU 150 can include a preamble extension field that provides sufficient time for the client device 105 to wake up or activate the high power radio 115. Thus, by the time the client device 105 has finished receiving the preamble extension field, the high power radio 115 can then be used to receive the remaining portion of the PPDU 150 which may use a higher data rate that can be received by the low power radio 110. Thus, a single PPDU 150 can be used to switch the client device 105 from the lower power mode to the high power mode, where a first portion of the PPDU 150 is received using the low power radio 110 and a remaining portion of the PPDU 150 is received using the high power radio 115.

In one embodiment, the AP 100 may vary the length of the preamble extension field in the PPDU 150, thereby changing the amount of time the client device 105 has to wake up the high power radio 115. For example, when first associating with the AP 100, the client device 105 may declare how much time it uses to wake up the high power radio 115. Thus, the AP 100 can set a customized length of the preamble extension field depending on the type of client device 105. As such, the AP 100 may send a wakeup PPDU 150 that has a preamble extension field with a longer length to a first type of client device 105 than when sending the wakeup PPDU 150 a different type of client device 105. This is discussed in more detail in FIG. 6. If a single PPDU is destined to multiple client devices, such as with OFDMA, then the AP 100 can set a customized length of the preamble extension field depending on the client device 105 that needs the longest preamble extension field.

FIG. 2 illustrates a wireless communication system for waking up a client device, according to one embodiment. FIG. 2 illustrates an AP 100 and a client device 205 (e.g., an IoT device, mobile phone, tablet, laptop, etc.). In this example, rather than having two radios as shown in FIG. 1, the client device 205 has a radio 210 that operates in a low power mode 215 and a high power mode 220. That is, FIGS. 1 and 2 illustrate that a client device can have discrete hardware radios and receivers for low-power and high-power operation, or can have one radio or receiver that operates in two different modes.

In either case, the wakeup PDDU transmitted by the AP 100 to the client device may be the same or very similar. For example, in FIG. 2, the AP 100 can transmit the wakeup PPDU 150 which has the preamble extension field that provides the radio 210 sufficient time to switch to the high power mode 220. That is, the radio 210 may receive a first portion of the PPDU 150 in the low power mode 215, but when receiving the preamble extension field, the radio 210 switches to the high power mode 220 to then receive the remaining portion of the PPDU 150.

FIG. 3 is a flowchart of a method 300 for waking up a client device, according to one embodiment. At block 305, the AP (e.g., the AP 100 in FIGS. 1 and 2) transmits a first portion of a preamble of the wakeup PPDU to a client device (e.g., the client device 105 or 205 in FIG. 1 or 2). In some embodiments, the first portion of the preamble includes fields that can be decoded using a low-power or low capability receiver (or a receiver that is operating in a low power mode). While FIG. 6 will discuss various fields that can be in the first portion of the preamble, some example fields include legacy training fields (e.g., short and long training fields) and one or more fields indicating data field formats (e.g., bandwidth, modulation coding scheme (MCS), number of SSs per station, and the like). Moreover, the first portion of the preamble can include metadata about a field or fields in a second portion of the preamble that is transmitted after the high power/high capability client device has woken up (or the client device has gone to a high power/high capability mode).

At block 310, the AP transmits a preamble extension field to the client device. The length (or duration) of this field is set to provide the client device(s) with time to wake up a higher-capability radio or switch the radio to a higher power mode. In one embodiment, the length of the preamble extension field is a fixed duration. Conversely, as will be discussed in FIG. 6, the preamble extension field can have a variable duration. For instance, some client devices may use more time than other client devices to wake up. The AP may customize the preamble extension field in response to the device type, which can improve usage of the medium by not using a preamble extension field that is longer than is needed to wake up the client device.

In one embodiment, the data in the preamble extension field may be filler data, which can be ignored by the client device. However, in other embodiments, the preamble extension field can include data that can improve the range of the communication between the AP and the client device. This is discussed in FIGS. 5A and 5B.

At block 315, the client device receives the first portion and the preamble extension field using a low power radio at the client device. The first portion of the preamble, implicitly (by signaling that the payload requires more capability than the low capability receiver supports) or explicitly, instructs the client device to wake up—e.g., switch to a higher capability radio or switch to a higher power mode. When doing so, the client device receives the data in the preamble extension field. Thus, the preamble extension field serves as a buffer between the first portion of the preamble and the remaining portion of the wakeup PPDU.

At block 320, the AP transmits the remaining portion of the wakeup PPDU to the client device. In one embodiment, the remaining portion includes a second portion of the preamble. That is, the first portion of the preamble and the preamble extension field can be received using a lower capability radio while the second portion of the preamble (and the payload of the PPDU) is received using a higher capability radio. The second portion of the preamble can include additional training fields for the payload. In some embodiments, in order for the client device to receive the remaining portion of the wakeup PPDU, it has to be in a high power state (or a normal mode of operation).

At block 325, the client device receives the remaining portion of the PPDU using a high power radio. In this manner, some of the wakeup PPDU is received using a lower power radio (or a radio in low power mode) while the remaining portion of the wakeup PPDU is received using a high power radio (or a radio in a high power mode). In this manner, a single PPDU can be used to switch the client device from a low power state to a high power state for normal data communications.

In one embodiment, at the end of the wakeup PPDU, the client device immediately turns off its high power radio/mode (switches to a low power mode), and the next transmission by the AP to the client device has to use a full wakeup PPDU again. In another embodiment, using an earlier negotiation between the AP and client device leads to an agreed duration for the client device to keep on its high power radio (e.g., remain in the woken up state), and the AP might omit the preamble extension during that agreed duration when sending subsequent data to the client device. In another embodiment, the client keeps on its high power radio until an event, and the AP might omit the preamble extension until that event. The event might be a flag sent from client to AP, or the end of the transmission opportunity (TXOP), or similar.

While the method 300 is discussed in the context of an AP waking up a client device, the roles may be reversed where the client device using the method 300 to wake up the AP in a low power state. In that example, the client device performs blocks 305, 310, and 320, while the AP performs blocks 315 and 325. In yet another example, the method 300 can be used by one client device to wake up another client device. In that example, a first client device performs blocks 305, 310, and 320, while a second client device performs blocks 315 and 325. As such, the method 300 can be generalized where one wireless station (STA) (e.g., a client device or AP) wakes up another wireless STA (e.g., a client device or AP). This also applies to the discussion that follows where the roles may be reversed between the client device or the AP, or one client device wakes up another client device.

FIG. 4 is a block diagram of a wakeup PPDU 400 with a preamble extension field, according to one embodiment. The PPDU 400 includes a preamble 405 and a payload 425. The preamble 405 can be logically divided into a first portion 410, a preamble extension field 415, and a second portion 420. In one embodiment, the first portion 410 and the preamble extension field 415 are received using a lower power radio, while the second portion 420 of the preamble 405 and the payload 425 are received using a higher power radio. In another embodiment, the preamble extension field 415 is not received by any radio.

In one embodiment, the preamble extension field 415 is placed between portions of the preamble 405 that are not directly necessary for decoding the data in the payload 425 and a portion of the preamble 405 that is directly necessary for decoding the payload 425. In this example, the first portion 410 may include the data fields that are not necessary for decoding the data in the payload 425, such as some types training fields (e.g., legacy short and long training fields) and data field format (e.g., bandwidth, modulation coding scheme (MCS), number of SSs per station, and the like). In contrast, the second portion 420 may include the fields that are directly necessary for decoding the payload 425 such as other types of short and long training fields. Stated differently, the second portion 420 can include data fields that do not have value until the client device has woken up.

In other embodiments, the second portion 420 can also include data fields of the preamble 405 that are not directly necessary for decoding the payload 425. In one example, the AP may include in the first portion 410 only the data fields used by the client device to determine if it should wake up its high power or capability radio, while the rest of the data fields in the preamble 405 (which could include data fields that are, and are not, used to decode the payload 425) can be sent in the second portion 420 after the client device's high power or capability radio has woken up.

Figures 5A, 5B:
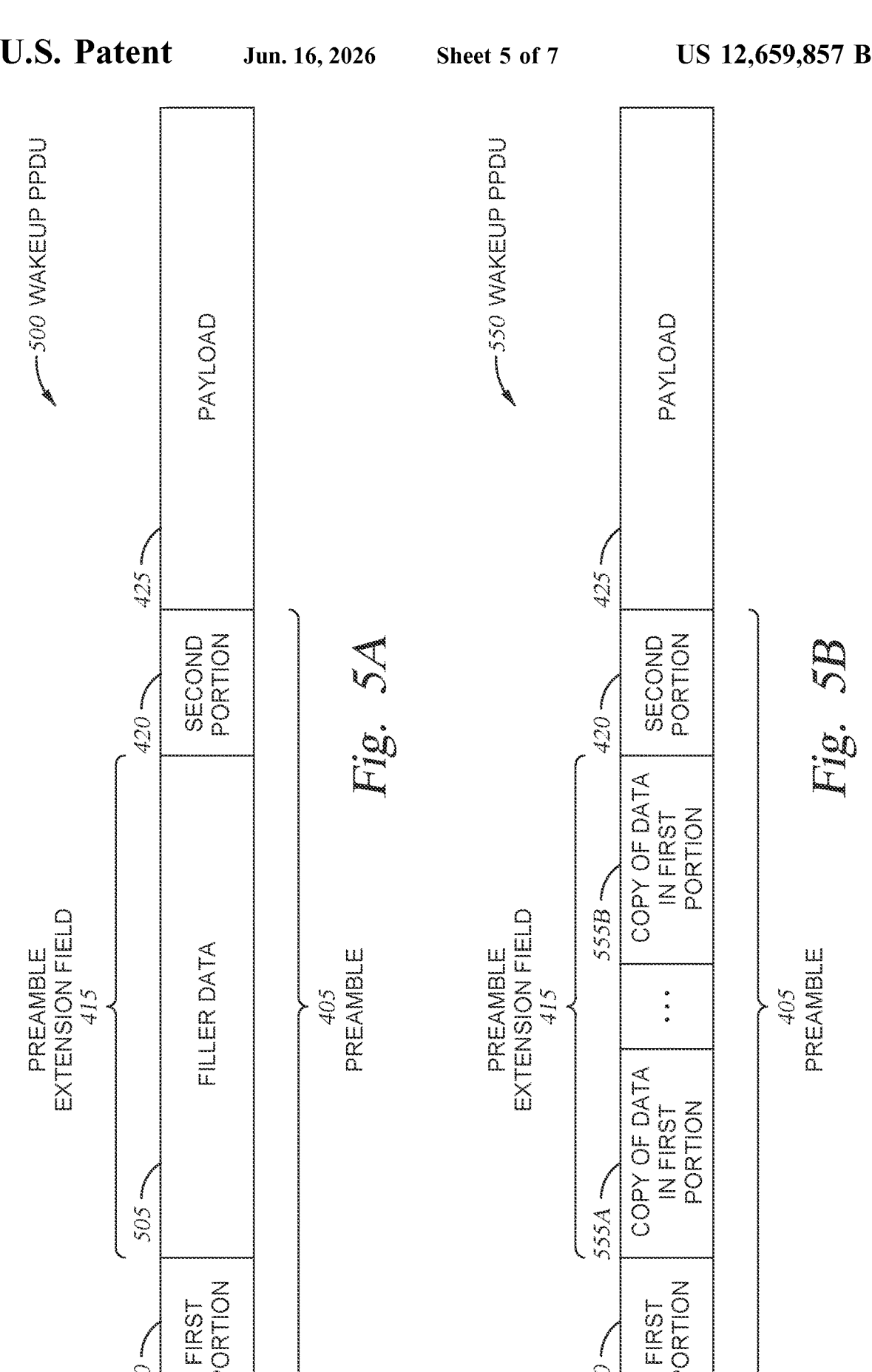
FIGS. 5A and 5B are block diagrams of a wakeup PPDU with different types of preamble extension fields, according to one embodiment.

FIGS. 5A and 5B are block diagrams of a wakeup PPDU with different types of preamble extension fields, according to one embodiment. In FIG. 5A, the wakeup PPDU 500 has the same structure as the PPDU 400 in FIG. 4, but is known to be filter data (e.g., a standard can stipulate that the preamble extensions fields only ever contain filler data). In another embodiment, the PPDU 500 indicates that the data within the preamble extension field 415 is filler data 505. In one embodiment, the filler data 505 can be ignored by the client device.

The filler data 505 is not limited to any particular type of data. In one embodiment, the filler data 505 can be data in the second portion 420 of the preamble. Put differently, the second portion 420 can be duplicated and extended to the left to create the preamble extension field 415. For example, the AP may replicate the training fields in the second portion 420 (e.g., ultra-high reliability short training field (UHR STF)) to create the filler data 505. The low power radio in the client device may ignore this replicated data, or may be unable to decode it given its limited capabilities. If the high-power radio in the client device can wake up slightly early than allowed (e.g., the preamble extension's duration is rounded up to a signal-able duration) then the high power radio in the client device might make some use of this replicated data.

In FIG. 5B, the wakeup PPDU 550 has the same structure as the PPDU 400 in FIG. 4, but is known to be copied data (e.g., a standard can stipulate that the preamble extensions fields only ever contain copied data). In another embodiment, the PPDU 550 indicates that the data within the preamble extension field 415 includes copies 555 of the first portion 410 of the preamble 405. In one embodiment, the copies 555 in the preamble extension field 415 may include the entire first portion 410 of the preamble 405. However, in other embodiments, the copies 555 include a subset of the fields in the first portion 410 of the preamble 405. For example, the copies 555 may include duplicates of the ultra-high reliability signal (UHR SIG), extremely high throughput signal (EHT SIG), LSIG, RLSIG, USIG, etc. in the first portion 410 of the preamble 405. The advantage of sending this data is that the client device can average the multiple copies 555 of the data in the first portion 410 which can improve the signal-to-noise ratio (SNR) and effectively improve the range of the wireless communication. This can make the wireless link between the AP and the client device more robust to noise and other factors. Some data fields in the first portion 410 that may not be included in the copies 555 could include a legacy STF (LSTF) or a legacy long training field (LLTF).

In other embodiments, the preamble extension field 415 could be used to transmit other types of information that is useful to the client device but is not included in the first portion 410. This extra information could include data related to rate adaption or data for closed loop power control.

FIG. 6 is a block diagram of a wakeup PPDU 600 with a variable length (e.g., adjustable length) preamble extension field, according to one embodiment. In this example, the AP can change the length of the preamble extension field 625 based on the hardware or software specifications of the client device. For example, the client device may declare its wakeup time to the AP when it associates with the AP. For instance, the client may declare how much time it needs to wake up using a power of two—e.g., 4 microseconds, 8 microseconds, 16 microseconds, 32 microseconds, etc. The AP can then adjust the data in the variable length preamble extension field 625 so it corresponds to that time duration (e.g., by adding the filler data or copies of the first portion of the preamble as discussed in FIGS. 5A and 5B). Thus, the AP can send wakeup PDDUs with preamble extension fields 625 with different lengths to different types of client devices. For a transmission to multiple client devices at the same time (e.g., OFDMA), the AP can send a wakeup PDDU with a preamble extension field 625 with a length that suffices for each of the client devices.

The first portion 610 of the preamble 605 includes a client ID 615 (or IDs) and a length indicator 620. The length indicator 620 can indicate the length of the preamble extension field 625. For example, the length indicator 620 can be set to N where N is a power of two so that when N=2, the duration of the field 625 is 4 microseconds, when N=3 the duration of the field 625 is 8 microseconds, etc. In another embodiment, the length indicator 620 may be a value of a lookup table that the client device can index into to determine the length of the field 625.

However, the length indicator 620 can be optional. For example, if the preamble extension field is not variable, the length indicator 620 may be omitted. For instance, an IEEE standard may define the length of the preamble extension field. Or the basic service set (BSS) established by the AP can advertise the duration of its preamble extension field, which means any client device connecting to the BSS should ensure that duration provides sufficient time for it to wake up.

Further, even if the preamble extension field 625 is variable, the length indicator 620 may be omitted. For example, if the client device declares the amount of time it uses to wake up, then it can simply assume that the wakeup PPDU 600 sent by the AP to the client itself will have a preamble extension field 625 with that amount of time.

The client ID(s) 615 can indicate the client device(s) to which the wakeup PPDU 600 is intended. In one embodiment, the client ID(s) 615 is/are included in a field such as high efficiency signal B (HESIGB) or EHTSIG. In another embodiment, an IEEE 802.11a/g/HT/VHT/HE/EHT style signaling can be used with no client ID. These indicate that the recipient is a single client, and so all clients should attempt to receive the PPDU.

Although not shown, the first portion 610 can include other types of training fields and signal field as discussed above such as LSIG, RLSIG, USIG, EHTSIF, HESIA, HESIGB, LLTF, LSTF, etc.

FIG. 7 is a block diagram of a wakeup PPDU 700 with a preamble extension field, according to one embodiment. The PPDU 700 includes a preamble 705 that illustrates some of the types of fields that may be in a second portion 710 that is transmitted after the client device wakes up. In this example, the second portion 710 includes the payload STF 715 and the payload LTF 720. In one embodiment, these training fields are used to decode the payload 425, and as such, are transmitted after the preamble extension field 415 so these fields are received by a high power or capability radio. For example, the low-power or low-capability radio in the client device may not be able to receive and process the payload STF 715 and the payload LTF 720. As such, as discussed above, the second portion 710 may at least include training fields in the preamble 705 that are used to enable the decoding of the payload 425. However, in other embodiments, the second portion 710 could include other fields in the preamble 705 that are not used towards decoding the payload 425.

Figure 8:
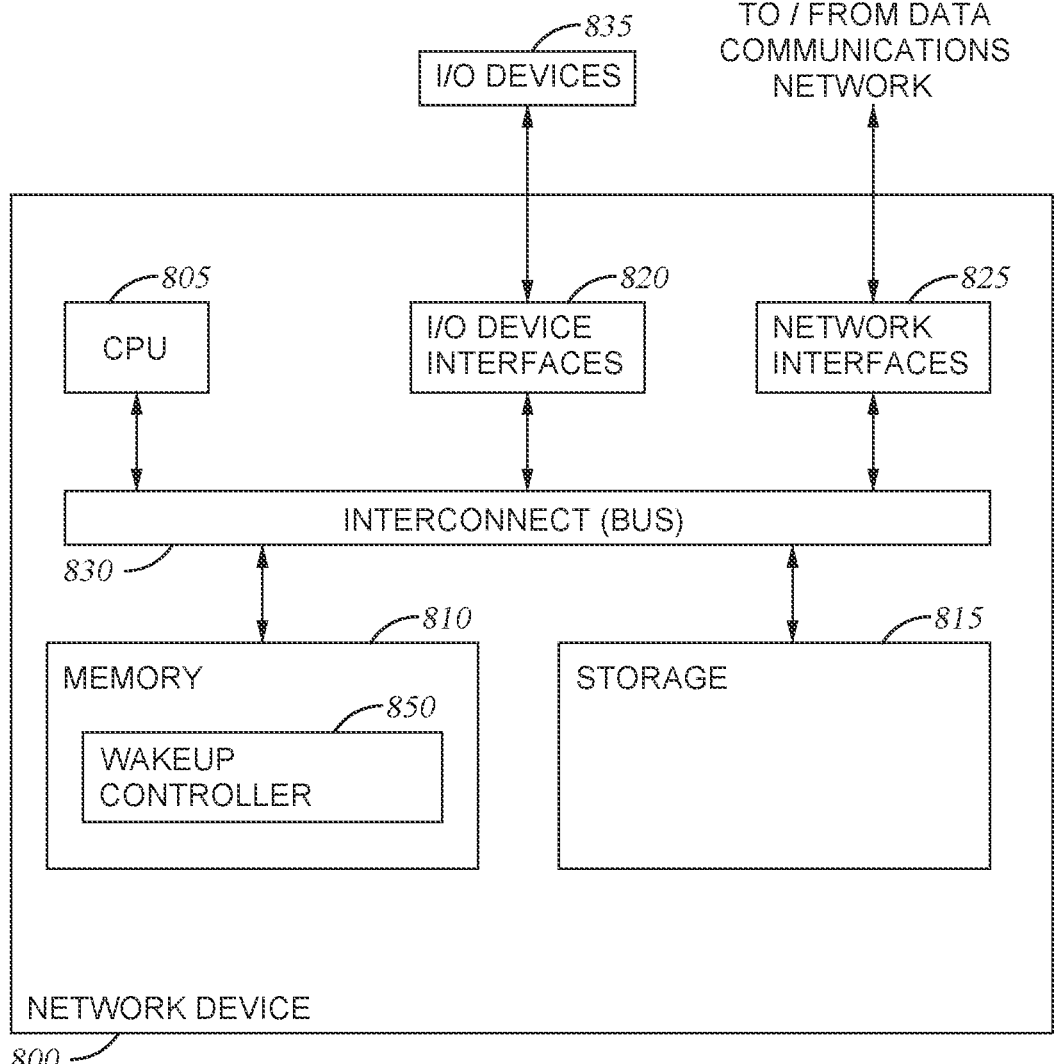
FIG. 8 depicts an example computing device configured to perform various aspects of the present disclosure, according to some embodiments of the present disclosure.

FIG. 8 depicts an example computing device (e.g., a network device 800) configured to perform various aspects of the present disclosure, according to some embodiments of the present disclosure. In some embodiments, the network device 800 corresponds to an AP 100 of FIG. 1. Although depicted as a physical device, in embodiments, the network device 800 may be implemented using virtual device(s), and/or across a number of devices (e.g., in a cloud environment).

As illustrated, the network device 800 includes a CPU 805, memory 810, storage 815, a network interface 825, and one or more I/O interfaces 820. In the illustrated embodiment, the CPU 805 retrieves and executes programming instructions stored in memory 810, as well as stores and retrieves application data residing in storage 815. The CPU 805 is generally representative of a single CPU and/or GPU, multiple CPUs and/or GPUs, a single CPU and/or GPU having multiple processing cores, and the like. The memory 810 is generally included to be representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 835 (such as keyboards, monitors, etc.) are connected via the I/O interface(s) 820. Further, via the network interface 825, the network device 800 can be communicatively coupled with one or more other devices and components (e.g., via a network, which may include the Internet, local network(s), and the like). As illustrated, the CPU 805, memory 810, storage 815, network interface(s) 825, and I/O interface(s) 820 are communicatively coupled by one or more buses 830.

In the illustrated embodiment, the memory 810 includes a wakeup controller 850, which may perform one or more embodiments discussed above (e.g., blocks 305, 310, and 320 in the method 300 in FIG. 3). The wakeup controller 850 may generate the wakeup PPDUs illustrated in FIGS. 4-7. Although depicted as discrete components for conceptual clarity, in embodiments, the operations of the depicted components (and others not illustrated) may be combined or distributed across any number of components. Further, although depicted as software residing in memory 810, in embodiments, the operations of the depicted components (and others not illustrated) may be implemented using hardware, software, or a combination of hardware and software.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An access point (AP), comprising:

a processor; and memory comprising an application that, when executed by the processor performs an operation comprising:

transmitting a first portion of a preamble of a wakeup physical layer protocol data unit (PPDU) to a client device, the first portion comprising information to wake up the client device, transmitting a preamble extension field to the client device after transmitting the first portion of the preamble, wherein the preamble extension field provides sufficient time for the client device to wake up a receiver operating at higher power, and transmitting a remaining portion of the wakeup PPDU to the client device which is received using the receiver operating at higher power, wherein the remaining portion comprises a second portion of the preamble of the wakeup PPDU and a data pay load.

2. The AP of claim 1, wherein the second portion of the preamble comprises at least one of a short training field (STF) or a long training field (LTF).

3. The AP of claim 2, wherein the preamble extension field includes a copy of the at least one of STF or LTF.

4. The AP of claim 1, wherein the preamble extension field includes a copy of at least of a training field or a data field transmitted in the first portion of the preamble.

5. The AP of claim 4, wherein the preamble extension field comprises a copy of at least one of high throughput signal (HT SIG), high efficiency SIG (HE SIG), extremely high throughput SIG (EHT SIG) or ultra-high reliability SIG (UHR SIG) in the first portion of the preamble.

6. The AP of claim 4, wherein the client device is configured to average the first portion of the preamble and data in the preamble extension field to improve a signal-to-noise ratio associated with the wakeup PPDU.

7. The AP of claim 1, wherein the receiver operating at higher power is a same receiver in a radio that operates in a low power mode to receive the first portion.

8. The AP of claim 1, wherein the first portion is received by a receiver operating at lower power, wherein the receiver operating at higher power and the receiver operating at higher power are part of two different radios.

9. The AP of claim 1, wherein after transmitting the wakeup PPDU to the client device, at least one of:

(i) the client device switches to a low power mode and a next transmission by the AP to the client device uses another wakeup PPDU;

(ii) the client device remains in a woken up state for a negotiated duration of time, wherein the AP omits the preamble extension field when sending data to the client device during the negotiated duration of time; or (iii) the client device remains in the woken up state until an event occurs, wherein the AP omits the preamble extension field when sending data to the client device until the event occurs.

10. The AP of claim 1, wherein waking up the receiver operating at higher power comprises the receiver becoming operable at higher power.

11. An access point (AP), comprising:

a processor; and memory comprising an application that, when executed by the processor performs an operation comprising:

transmitting a first portion of a preamble of a wakeup physical layer protocol data unit (PPDU) to a client device, the first portion comprising information to wake up the client device, one or more client identifiers (IDs) corresponding to one or more client devices, and a length of extension field indicating a length of a preamble extension field, transmitting the preamble extension field to the client device after transmitting the first portion of the preamble, wherein the preamble extension field provides sufficient time for the client device to wake up a receiver operating at higher power, and transmitting a remaining portion of the wakeup PPDU to the client device which is received using the receiver operating at higher power.

12. The AP of claim 11, wherein the length of the preamble extension field is adjustable based on a type of the client device or reported capabilities of the client device to the AP.

13. The AP of claim 11, wherein the remaining portion further comprises a second portion of the preamble of the wakeup PDDU and a data payload.

14. The AP of claim 13, wherein the second portion of the preamble comprises at least one of a short training field (STF) or a long training field (LTF), wherein the preamble extension field includes a copy of the at least one of STF or LTF.

15. The AP of claim 11, wherein the preamble extension field includes a copy of at least of a training field or a data field transmitted in the first portion of the preamble.

16. The AP of claim 11, wherein the client device is configured to average the first portion of the preamble and data in the preamble extension field to improve a signal-to-noise ratio associated with the wakeup PPDU.

17. The AP of claim 11, wherein the receiver operating at higher power is a same receiver in a radio that operates in a low power mode to receive the first portion.

18. The AP of claim 11, wherein waking up the receiver operating at higher power comprises the receiver becoming operable at higher power.

19. A first wireless station (STA), comprising:

a processor; and memory comprising an application that, when executed by the processor performs an operation comprising:

receiving a first portion of a preamble of a wakeup physical layer protocol data unit (PPDU) from a second wireless STA, the first portion comprising information to wake up the first wireless STA, receiving a preamble extension field from the second wireless STA after receiving the first portion of the preamble, wherein the preamble extension field provides sufficient time for the client device to wake up a receiver operating at higher power, and receiving a remaining portion of the wakeup PPDU at the first wireless STA which is received using the receiver operating at higher power, wherein the remaining portion comprises a second portion of the preamble of the wakeup PDDU and a data payload.

20. The STA of claim 19, wherein waking up the receiver operating at higher power comprises the receiver becoming operable at higher power.

* * * * *